Patented May 23, 1950

2,508,480

UNITED STATES PATENT OFFICE 2,508,480

WATERPROOFING COMPOUND FOR MASONRY

Harry L. Ainsworth, Denver, Colo.

No Drawing. Application December 31, 1947, Serial No. 795,123

1 Claim. (Cl. 106—90)

This invention relates to a composition for stopping pores, cracks, and holes in masonry or concrete walls, floors, and the like, for preventing the passage of water. There are many waterproofing compositions on the market which more or less effectively seal the surface pores, but they are ineffective for stopping large cracks and holes.

The principal object of this invention is to provide a compound which will stop relatively large cracks and holes in masonry and concrete walls, even though water be flowing through these cracks and holes at the time of application.

Other objects are to provide a composition which can be easily and economically manufactured, and easily and efficiently applied to a wet wall.

Other objects and advantages reside in the invention and its use. These will become more apparent from the following description.

The improved compound comprises a dry mixture of the following ingredients in substantially the named proportions:

| | Parts |
|---|---|
| Ammonium alum | 2 |
| Magnesium sulfate | 5 |
| Sodium chloride | 2 |
| Potassium bitartrate | 1 |
| Ground sand (100 mesh) | 16 |
| Calcium sulphate | 37 |
| Portland cement | 37 |

The Portland cement acts as a base and carrier for all the other ingredients and, of course, acts as a hardening and solidifying agent. The calcium sulphate acts in a similar way and increases the rapidity of the hardening of the compound. The magnesium sulphate in the mixture generates heat which causes the compound to swell in the pores and other openings of the masonry. The magnesium sulphate also melts slowly and helps to seal any pores which are caused in the compound by the swelling action. The ammonium alum dissolves under the influence of the heat and moisture present and acts to fill the smaller pores in both the compound and the masonry. The sodium chloride, preferably ground or powdered rock salt acts as a hardener and also dissolves and acts as a sealer and when once set, it will not again melt or dissolve. The sand is ground to 100 mesh fineness and serves as a diluent and filler and also acts to retard the speed of setting. The potassium bitartrate acts as a retarder to prevent too rapid setting of the mixture.

For use, the above compound is mixed with sufficient water to a thick, putty-like consistency which can be applied to the surface desired sealed with a putty knife or similar tool. The compound will set watertight in approximately 90 minutes, due to its heavy putty-like consistency, and will hold back a considerable flow of water while setting. The compound will tenaciously adhere to any surface, regardless of its smoothness, thereby forming an ideal sealing compound for glass aquariums and the like.

While one admixture of the improved compound has been described above, together with theories which are believed to account for its unusually efficient action, it is to be understood that the invention is not limited to the exact compound or the exact procedure described, except in so far as such limitations are contained within the appended claim nor is it dependent upon the accuracy of the theories which have been advanced herein.

Having thus described the invention, what is claimed and desired secured by Letters Patent is:

A compound for forming a waterproof paste for sealing concrete walls and the like, comprising: ammonium alum, 2 parts; magnesium sulphate, 5 parts; potassium bitartrate, 1 part; sodium chloride, 2 parts; ground sand (100 mesh), 16 parts; calcium sulphate, 37 parts; and Portland cement, 37 parts.

HARRY L. AINSWORTH.

No references cited.